(12) United States Patent
Rupert (10) Patent No.: US 12,401,056 B2
(45) Date of Patent: Aug. 26, 2025

(54) LITHIUM OXIDE ARGYRODITES

(71) Applicant: Blue Current, Inc., Hayward, CA (US)

(72) Inventor: Benjamin Rupert, Berkeley, CA (US)

(73) Assignee: Blue Current, Inc., Hayward, CA (US)

( * ) Notice: Subject to any disclaimer, the term of this patent is extended or adjusted under 35 U.S.C. 154(b) by 634 days.

(21) Appl. No.: 16/576,570

(22) Filed: Sep. 19, 2019

(65) Prior Publication Data

US 2020/0087155 A1 Mar. 19, 2020

Related U.S. Application Data

(60) Provisional application No. 62/744,331, filed on Oct. 11, 2018, provisional application No. 62/733,501, filed on Sep. 19, 2018.

(51) Int. Cl.
| | |
|---|---|
| *H01M 10/0562* | (2010.01) |
| *C01D 15/02* | (2006.01) |
| *C01D 15/04* | (2006.01) |
| *H01M 4/131* | (2010.01) |
| *H01M 4/62* | (2006.01) |

(52) U.S. Cl.
CPC ........ *H01M 10/0562* (2013.01); *C01D 15/02* (2013.01); *C01D 15/04* (2013.01); *H01M 4/131* (2013.01); *H01M 4/62* (2013.01); *H01M 2300/0068* (2013.01); *H01M 2300/0071* (2013.01)

(58) Field of Classification Search
None
See application file for complete search history.

(56) References Cited

U.S. PATENT DOCUMENTS

| | | |
|---|---|---|
| 8,741,484 B2 | 6/2014 | Karthikeyan et al. |
| 9,017,839 B2 | 4/2015 | Tsuchida et al. |
| 9,093,722 B2 | 7/2015 | Zhang et al. |
| 9,105,941 B2 | 8/2015 | Ohtomo et al. |
| 9,812,734 B2 | 11/2017 | Miyashita et al. |
| 9,899,701 B2 | 2/2018 | Miyashita et al. |
| 9,899,702 B2 | 2/2018 | Miyashita et al. |
| 9,926,411 B1 | 3/2018 | Burdynska et al. |

(Continued)

FOREIGN PATENT DOCUMENTS

| | | | |
|---|---|---|---|
| CN | 105229841 A | | 1/2016 |
| CN | 106848391 | * | 6/2017 |

(Continued)

OTHER PUBLICATIONS

Zhang et al. "All-in-one improvement toward Li6PS5Br—based solid electrolyte triggered by compositional tune". Journal of Power Sources, 410-411, [2019], pp. 162-170.*

(Continued)

*Primary Examiner* — Laura Weiner
(74) *Attorney, Agent, or Firm* — Weaver Austin Villeneuve & Sampson LLP (57) ABSTRACT

Lithium oxide argyrodites having the formula $Li_{(6-y)}PS_4O_{(1-y)}X_{(1+y)}$ where X is a halide anion and y is a number between 0 and 0.8, inclusive, are provided herein. Also provided are methods of synthesizing the lithium oxide argyrodites and composites including the lithium oxide argyrodites, as well as other alkali metal oxide argyrodites and related methods and composites.

17 Claims, 6 Drawing Sheets

(56) References Cited

U.S. PATENT DOCUMENTS

| | | | |
|---|---|---|---|
| 9,972,838 | B2 | 5/2018 | Teran et al. |
| 10,079,404 | B1 | 9/2018 | Burdynska et al. |
| 11,394,054 | B2 | 7/2022 | Villaluenga et al. |
| 11,394,064 | B2 | 7/2022 | Honjo |
| 11,572,459 | B2 | 2/2023 | Burdynska et al. |
| 12,191,443 | B2 | 1/2025 | Rupert |
| 2015/0147660 | A1 | 5/2015 | Fujiki et al. |
| 2015/0357675 | A1 | 12/2015 | Ohtomo et al. |
| 2015/0372345 | A1 | 12/2015 | Kato et al. |
| 2016/0226097 | A1 | 8/2016 | Wegner et al. |
| 2016/0293946 | A1 | 10/2016 | Ritter et al. |
| 2017/0162862 | A1 | 6/2017 | Thielen et al. |
| 2017/0250439 | A1* | 8/2017 | Nitta ................ H01M 10/0585 |
| 2017/0352916 | A1 | 12/2017 | Miyashita et al. |
| 2018/0351148 | A1 | 12/2018 | Schneider et al. |
| 2019/0081352 | A1 | 3/2019 | Sasaki et al. |
| 2019/0097262 | A1 | 3/2019 | Chen et al. |
| 2019/0140312 | A1 | 5/2019 | Ramanathan et al. |
| 2019/0140313 | A1 | 5/2019 | Terai et al. |
| 2019/0148769 | A1 | 5/2019 | Aihara et al. |
| 2019/0221884 | A1 | 7/2019 | Utsuno et al. |
| 2019/0260018 | A1 | 8/2019 | Matsuyama et al. |
| 2019/0312304 | A1 | 10/2019 | Uesugi et al. |
| 2020/0220207 | A1 | 7/2020 | Sato et al. |
| 2020/0403267 | A1 | 12/2020 | Li et al. |
| 2021/0047195 | A1 | 2/2021 | Rupert |
| 2021/0050620 | A1 | 2/2021 | Rupert |
| 2022/0271288 | A1 | 8/2022 | Burdynska et al. |
| 2024/0198419 | A1 | 6/2024 | Rupert et al. |
| 2025/0201910 | A1 | 6/2025 | Rupert |

FOREIGN PATENT DOCUMENTS

| | | | |
|---|---|---|---|
| CN | 106848391 | A | 6/2017 |
| CN | 108493479 | A | 9/2018 |
| CN | 109526242 | A | 3/2019 |
| CN | 106848391 | B | 5/2019 |
| EP | 3499629 | A1 | 6/2019 |
| EP | 3407412 | B1 | 4/2021 |
| JP | 2011076792 | A | 4/2011 |
| JP | 2012054212 | A | 3/2012 |
| JP | 2016134316 | A | 7/2016 |
| JP | 2016534493 | A | 11/2016 |
| JP | 2017010936 | A | 1/2017 |
| JP | 2017045613 | A | 3/2017 |
| JP | 2017152352 | A | 8/2017 |
| JP | 2017157300 | A | 9/2017 |
| JP | 2017199631 | A | 11/2017 |
| JP | 2018029058 | A | 2/2018 |
| JP | 2019145299 | A | 8/2019 |
| JP | 2020522091 | A | 7/2020 |
| WO | WO-2015043889 | A1 | 4/2015 |
| WO | WO-2017002971 | A1 | 1/2017 |
| WO | WO-2018092366 | A1 | 5/2018 |
| WO | WO-2018218057 | A2 | 11/2018 |
| WO | WO-2019098245 | A1 | 5/2019 |
| WO | WO-2019131725 | A1 | 7/2019 |
| WO | WO-2020252427 | A1 | 12/2020 |
| WO | WO-2021251347 | A1 | 12/2021 |

OTHER PUBLICATIONS

Kong, et al., "Structural Characterisation of the Li Argyrodites $Li_7PS_6$ and $Li_7PSe_6$ and their Solid Solutions: Quantification of Site Preferences by MAS-NMR Spectroscopy," Chem. Eur. J., 2010, vol. 16, pp. 5138-5147.

Bernges, T. et al., "Competing Structural Influences in the Li Superionic Conducting Argyrodites Li6PS5-xSexBr ($0 \leq x \leq 1$) upon Se Substitution," ACS Publications, Inorganic Chemistry, DOI: 10.1021/acs.inorgchem.8b02443, pubs.acs.org/IC, Aug. 29, 2018, 9 pages.

Chen, HM et al., "Stability and ionic mobility in argyrodite-related lithium-ion solid electrolytes," Phys. Chem. Chem. Phys, vol. 17, pp. 16494-16506, May 29, 2015.

Chen, T. et al., "Argyrodite Solid Electrolyte with Stable Interface and Superior Dendrite Suppression Capability Realized by ZnO Co-doping," ACS Applied Materials & Interfaces, American Chemical Society, DOI: 10.1021/acsami.9b13313, Publication Date (Web) Oct. 9, 2019, Downloaded from pubs.acs.org on Oct. 13, 2019, 30 pages.

Dopant', Wikipedia [retrieved from internet on Sep. 28, 2020 (Sep. 28, 2020), 3 pages, retrieved from https://en.wikipedia.org/wiki/Dopant.

Extended European search report dated Jun. 10, 2022, in Application No. EP19861315.0.

International Preliminary Report on Patentability dated Mar. 3, 2022, in Application No. PCT/US2020/070412.

International Preliminary Report on Patentability and Written Opinion dated Apr. 1, 2021 issued in PCT/US2019/051990.

International Preliminary Report on Patentability dated Jan. 20, 2022 in PCT Application No. PCT/US2020/070257.

International Search Report and Written Opinion dated Dec. 2, 2019 issued in PCT/US2019/051990.

International Search Report and Written Opinion dated Nov. 13, 2020 issued in Application No. PCT/US20/70257.

International Search Report and Written Opinion dated Oct. 21, 2020 issued in Application No. PCT/US20/70412.

Invitation to Pay additional Fees dated Sep. 16, 2020, issued in Application No. PCT/US20/70257.

Kong, S. et al., "Li6PO5Br and Li6PO5Cl: The first Lithium-Oxide-Argyrodites," WILEY-VCH Verlag Gmbh & Co. KGaA, Weinheim, DOI: 10.1002/zaac.201000121, 2010, 1920-1924.

Schneider, H. et al., "Stabilization of Highly Conductive Lithium Argyrodites byMeans of Lithium Substitution: The Case of Li6Fe0.5PS6," Wiley-VCH Verlag Gmbh & Co. KGaA, Weinheim, Wiley Online Library, ChemPubSOc Europe, DOI: 10.1002/slct.201803388, ChemistrySelect, 2019, 3351-3354.

US Final Office Action dated Dec. 1, 2020 issued in U.S. Appl. No. 16/829,962.

US Final Office Action dated Sep. 23, 2021 issued in U.S. Appl. No. 16/829,962.

U.S. Non-Final Office Action dated Jul. 15, 2022, in U.S. Appl. No. 16/947,793.

U.S. Non-Final Office Action dated May 13, 2022 in U.S. Appl. No. 16/829,962.

US Notice of Allowance dated Feb. 1, 2021 issued in U.S. Appl. No. 16/829,962.

US Office Action dated Mar. 8, 2021 issued in U.S. Appl. No. 16/829,962.

US Office Action dated Aug. 27, 2020 issued in U.S. Appl. No. 16/829,962.

JP Office Action dated Nov. 22, 2022 in Application No. CN201980067972.3 with English translation.

Yu. C, et al., "Synthesis, structure and electrochemical performance of the argyrodite $Li_6PS_5Cl$ solid electrolyte for Li-ion solid state batteries", Electrochimica Acta, vol. 215, pp. 93-99.

CN Office Action dated Jul. 12, 2023, in Application No. CN201980067972.3 with English translation.

U.S. Final office Action dated Apr. 20, 2023 in U.S. Appl. No. 16/947,793.

U.S. Appl. No. 17/986,773, inventors Rupert., filed on Nov. 14, 2022.

CN Office Action dated Dec. 7, 2023 in CN Application No. 201980067972.3 with English Translation.

Database WPI Week 201943 Thomson Scientific, London, GB; AN 2019-45721N XP002809879.

Database WPI Week 201955 Thomson Scientific, London, GB; AN 2019-578147 XP002809880.

EP Extended European Search Report dated Oct. 5, 2023, in Application No. EP20854194.6.

JP Office Action dated Sep. 12, 2023, in application No. JP2021-515186.

U.S. Non-Final Office Action dated Oct. 31, 2023, in U.S. Appl. No. 16/947,793

(56) References Cited

OTHER PUBLICATIONS

U.S. Appl. No. 18/556,807, inventors Rupert B, et al., filed on Oct. 23, 2023.
EP Office Action dated May 22, 2024, in EP Application No. 20854194.6.
JP Office Action dated Sep. 12, 2023, in application No. JP2021-515186 with English translation.
U.S. Final office Action dated Jun. 8, 2023 in U.S. Appl. No. 17/304,645.
U.S. Non-Final office Action dated Aug. 30, 2022 in U.S. Appl. No. 17/304,645.
U.S. Non-Final Office Action dated Jan. 19, 2024 in U.S. Appl. No. 17/304,645.
U.S. Notice of Allowance dated Jun. 28, 2024 in U.S. Appl. No. 16/947,793.
Yu. C, et al., "Revealing the relation between the structure, Li-ion conductivity and solid-state battery performance of the argyrodite $Li_6PS_5Br$ solid electrolyte", Journal of Materials Chemistry A, 2017, vol. 5, pp. 21178-81188.
Zhang. J, et al., "All-solid-state batteries with slurry coated $LiNi0.8Co0.1Mn0.1O_2$ composite cathode and $Li_6PS_5Cl$ electrolyte: Effect of content", Journal of Power Sources 391, 2018 pp. 73-79.
CN Office Action dated Aug. 22, 2024 in CN Application No. 201980067972.3 with English translation.
JP Office Action dated Aug. 27, 2024 in JP Application No. 2022-509675 with English translation.
KR Office Action dated Jul. 10, 2024 in KR Application No. 10-2021-7011491, with English Translation.
U.S. Corrected Notice of Allowance dated Jul. 9, 2024 in U.S. Appl. No. 16/947,793.
U.S. Corrected Notice of Allowance dated Oct. 9, 2024 in U.S. Appl. No. 16/947,793.
U.S. Notice of Allowance dated Jul. 31, 2024 in U.S. Appl. No. 17/304,645.
U.S. Appl. No. 18/900,493, inventor Rupert B, filed on Sep. 27, 2024.
U.S. Restriction requirement dated Aug. 27, 2024 in U.S. Appl. No. 17/626,092.
CN Board Decision dated Nov. 29, 2024 in CN Application No. 201980067972.3, with English Translation.
CN Office Action dated Mar. 28, 2025 in CN Application No. 202080064903.X, with English Translation.
JP Office Action dated Apr. 22, 2025 in JP Application No. 2022509675, with English Translation.
U.S. Non-Final Office Action dated Feb. 11, 2025 in U.S. Appl. No. 17/626,092.
KR Office Action dated Jul. 7, 2025 in KR Application No. 10-2022-7007437 with machine translation.
JP Office Action dated May 27, 2025 in JP Application No. 2024086180, with English Translation.

\* cited by examiner

LITHIUM OXIDE ARGYRODITES

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Solid electrolytes present various advantages over liquid electrolytes for secondary batteries. For example, in lithium ion batteries, inorganic solid electrolytes may be less flammable than conventional liquid organic electrolytes. Solid electrolytes can also facilitate use of a lithium metal electrode by resisting dendrite formation. Challenges to using solid electrolytes include low conductivities and poor electrochemical stability.

SUMMARY

One aspect of the disclosure relates to a lithium oxide argyrodite of the general formula:
$Li_{(6-y)}PS_4O_{(1-y)}X_{(1+y)}$ where X is a halide and y is a number between 0 and 0.8.
In some embodiments, y is between 0.5 and 0.7. In some embodiments, y is between 0.55 and 0.65. In some embodiments, y is between 0.3 and 0.5, e.g. between 0.35 and 0.45. In some embodiments y is about one of 0, 0.1, 0.2, 0.3, 0.4, 0.5, 0.6, 0.7, 0.8, and 0.9. In some embodiments, the lithium oxide argyrodite is incorporated into a solid-state battery or fuel cell. In some embodiments, the lithium oxide argyrodite is incorporated into or forms an electrolyte separator. In some embodiments, the lithium oxide argyrodite is incorporated into an electrode.

Another aspect of the disclosure relates to a method of synthesizing a lithium oxide argyrodite, comprising: adding a stoichiometric amount of $Li_2O$ and LiX to $Li_3PS_4$ and reacting the $Li_2O$, LiX, and $Li_3PS_4$ to form the lithium oxide argyrodite $Li_{(6-y)}PS_4O_{(1-y)}X_{(1+y)}$ where X is a halide and y is a number between 0 and 0.8. In some embodiments, the method further comprises synthesizing $Li_3PS_4$. In some embodiments, the $Li_2O$, LiX, and $Li_3PS_4$ are reacted in a ball mill without solvent. In some embodiments, $Li_2O$ and LiX are added in a solvent. In some embodiments, the method further involves evaporating the solvent. In some embodiments, the solvent is ethanol. In some embodiments, the method further includes comprising annealing the lithium oxide argyrodite.

Another aspect of the disclosure is an solid electrolytic composition comprising a film including an organic phase comprising one or more polymers and a Li-conducting inorganic phase comprising a lithium oxide argyrodite of the general formula: $Li_{(6-y)}PS_4O_{(1-y)}X_{(1+y)}$ where X is a halide and y is a number between 0 and 0.8. In some embodiments, the one or more polymers comprise a hydrophobic polymer. In some embodiments, the one or more polymers are not ionically conductive. In some embodiments, the one or more polymers include styrene ethylene butylene styrene (SEBS), styrene-butadiene-styrene (SBS), styrene-isoprene-styrene (SIS), styrene-isoprene/butadiene-styrene (SIBS), styrene-ethylene/propylene (SEP), styrene-ethylene/propylene-styrene (SEPS), and isoprene rubber (IR). In some embodiments, the one or more polymers comprise copolymer comprises plastic and elastic segments. In some embodiments, the film is between 0.5 wt %-60 wt % polymer, 1 wt %-40 wt % polymer, or 5 wt %-30 wt % polymer.

Another aspect of the disclosure is a slurry, paste, or solution comprising one or more solvents, a polymer, and ionically conductive lithium oxide argyrodite particles. Another aspect of the disclosure relates to an electrode including an active material, a lithium oxide argyrodite, and an organic polymer.

Another aspect of the disclosure are alkali metal oxide argyrodites having the formula:
$A_{(6-y)}PS_4O_{(1-y)}X_{(1+y)}$ where A is an alkali metal, X is a halide, and y is a number between 0 and 0.8, inclusive. Methods of synthesis of the alkali metal oxide argyrodites and compositions and devices including them are also provided.

These and other aspects of the disclosure are discussed further with reference to the figures.

DETAILED DESCRIPTION

Provided herein are solid materials that are ionically conductive and electrochemically stable. Some implementations of the materials are in accordance with Formula I:

$$Li_{(6-y)}PS_4O_{(1-y)}X_{(1+y)} \qquad \text{(Formula I)}$$

wherein X is a halide and y is a number between 0 and 0.8, inclusive. The materials are co-crystals with the materials of Formula I also expressed as Formula II:

$$Li_3PS_4 * (1-y)Li_2O * (1+y)X \qquad \text{(Formula II)}$$

wherein X is a halide and y is a number between 0 and 0.8, inclusive. In some embodiments, X is bromine (Br) or chlorine (Cl) such that the anion is a bromide or chloride. Mixed halide systems are also provided, with implementations of a two halide system given in Formula III:

$$Li_{(6-y)}PS_4O_{(1-y)}X^1_u X^2_z \qquad \text{(Formula III)}$$

wherein $X^1$ and $X^2$ are halides, y is a number between 0 and 0.8, inclusive and u+z=1+y.

Also provided are methods of fabricating the materials and batteries and battery components containing the materials.

INTRODUCTION

The mineral Argyrodite, $Ag_8GeS_6$, can be thought of as a co-crystal of $Ag_4GeS_4$ and two equivalents of $Ag_2S$. Substitutions in both cations and anions can be made in this crystal while still retaining the same overall spatial arrangement of the various ions. For instance, in the first lithium-containing example of this mineral type, $Li_7PS_6$, $PS_4^{3-}$ ions reside on the crystallographic location occupied by $GeS_4^{4-}$ in the original mineral, while $S^{2-}$ ions retain their original positions and Li$^+$ ions take the positions of the original 4$^+$ ions. As there are fewer cations in Li$_7$PS$_6$ compared to the original Ag$_8$GeS$_6$, some cation sites are vacant. These structural analogs of the original Argyrodite mineral are often referred to as argyrodites as well. Both Ag$_8$GeS$_6$ and Li$_7$PS$_6$ are orthorhombic crystals at room temperature, while at elevated temperatures phase transitions to cubic space groups occur. Making the further substitution of one equivalent of LiCl for one Li$_2$S yields the material Li$_6$PS$_5$Cl, which still retains the argyrodite structure but undergoes the orthorhombic to cubic phase transition below room temperature and has a significantly higher lithium-ion conductivity. Because the overall arrangement of cations and anions remains the same in this material as well, it is also commonly referred to as an argyrodite. Further substitutions which also retain this overall structure may therefore also be referred to as argyrodites.

Figure 1:
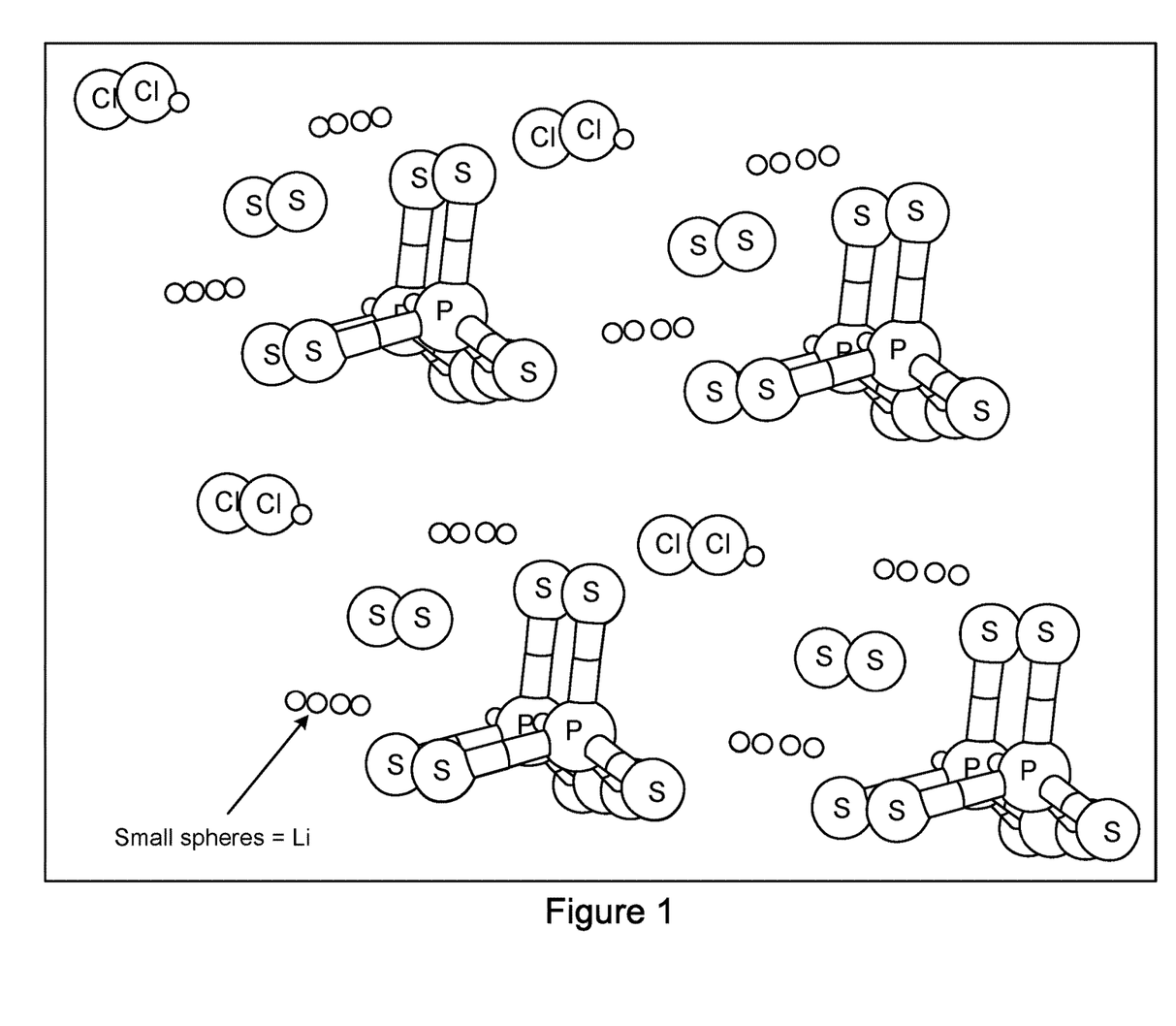
FIG. 1 shows the crystal structure of $Li_6PS_5Cl$.

Sulfide-based lithium argyrodite materials exhibit high Li$^+$ mobility and are of interest in lithium batteries. A typical material in this family is Li$_6$PS$_5$Cl, which is a ternary co-crystal of Li$_3$PS$_4$, Li$_2$S, and LiCl. FIG. 1 shows the crystal structure of Li$_6$PS$_5$Cl.

This material uses earth abundant elements and can have high lithium ion conductivities. Despite its advantages among solid state lithium ion electrolytes it still has several drawbacks. The presence of lithium sulfide in the crystal structure means that upon adsorption of moisture it may release toxic and flammable hydrogen sulfide. Furthermore, while the components are all relatively earth abundant, lithium sulfide is an expensive material compared to many other electrolyte components, including other lithium salts. Sulfide materials also generally have poor wetting interactions with lithium metal. This is an issue when constructing lithium metal anode batteries as the poor surface interactions can lead to uneven lithium metal deposition resulting in uneven mechanical stress in the cell and in dendrite growth.

Argyrodites with the general formula Li$_{(6-y)}$PS$_4$O$_{(1-y)}$X$_{(1+y)}$ (also expressed Li$_3$PS$_4$*(1-y)Li$_2$O*(1+y) X) where X is a halide anion and y is a number between 0 and 0.8, inclusive, are provided herein. These materials may be referred to as lithium oxide argyrodites, and have the same overall arrangement as Ag$_8$GeS$_6$ as discussed above, with PS$_4$ anions, X anions, and oxide anions in a regular arrangement with lithium cations in between them. The halide is typically Cl$^-$ or Br$^-$ though could be iodide or fluoride. In some embodiments, y is between 0 and 0.6. In particular embodiments, y is between 0.3 and 0.5, inclusive, or between 0.35 and 0.45, inclusive. In particular embodiments, y is between 0.5 and 0.7, inclusive, or between 0.55 and 0.65, inclusive. It should be noted that in some embodiments, oxygen atoms of the LiO$_2$ moiety may exchange places with the S atoms of the PS$_4$ moiety while maintaining the argyrodite crystal structure. Unless otherwise stated, the general formula Li$_{(6-y)}$PS$_4$O$_{(1-y)}$X$_{(1+y)}$ includes these embodiments.

Figure 2:
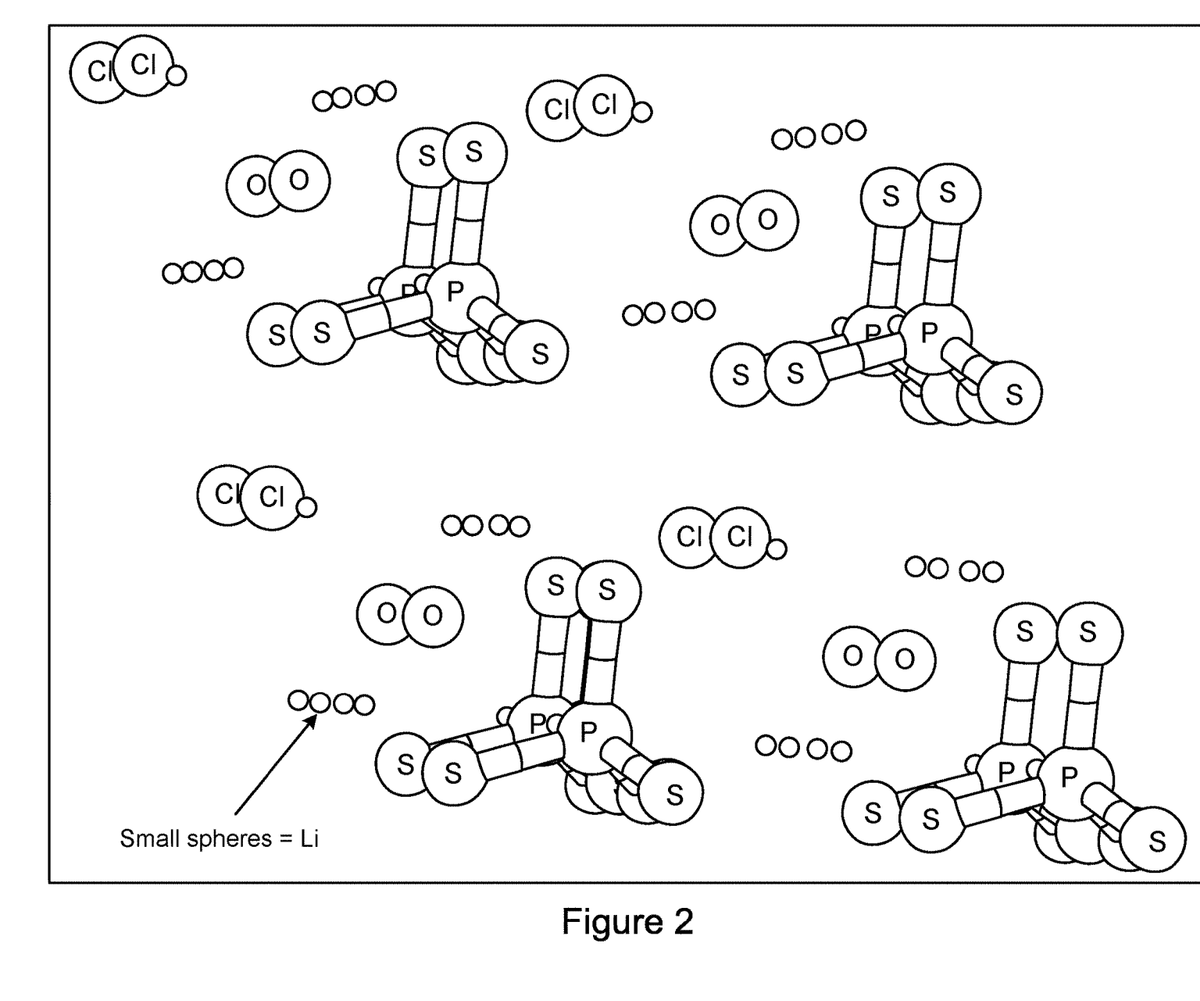
FIG. 2 shows an example crystal structure of $Li_6PS_4OCl$.
Figure 3:
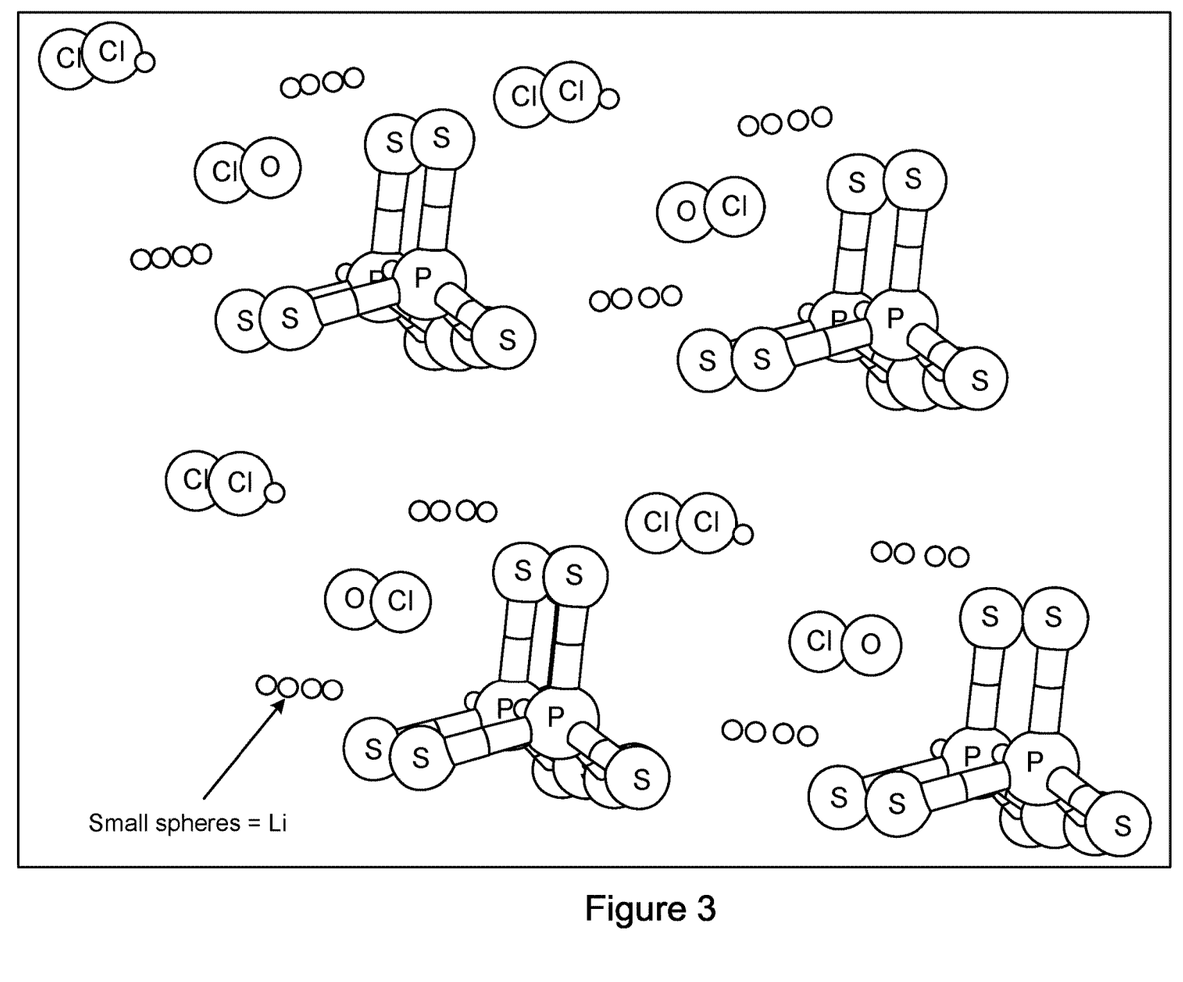
FIG. 3 shows an example crystal structure of $Li_{5.5}PS_4O_{0.5}Cl_{1.5}$.

FIGS. 2 and 3 provide crystal structures of two examples of lithium oxide argyrodites. FIG. 2 shows an example structure of Li$_6$PS$_4$OCl (y=0) and FIG. 3 shows an example structure of Li$_{5.5}$PS$_4$O$_{0.5}$Cl$_{1.5}$ (y=0.5).

This family of materials may provide one or more of the following advantages according to various implementations. The material replaces some sulfur with oxygen, which is a lighter element, and thus may have a slight gravimetric energy density advantage in the final electrochemical device. Further, to the extent that lithium sulfide is replaced with lithium oxide, the material is less expensive to produce. Because there is no S$^{2-}$ anion, there is no risk of immediate generation of toxic hydrogen sulfide if the material comes in contact with atmospheric moisture or bulk water. (The PS$_4^{3-}$ anion will eventually degrade to hydrogen sulfide and PO$_4^{3-}$, however this is an extremely slow process and is not generally considered hazardous).

In some embodiments, use of the lithium oxide argyrodites reduces the risk of dendrite formation. This may be because the lithium oxide component imparts a more favorable surface interaction with lithium metal compared to most sulfide-based lithium ion conductors, including Li$_6$PS$_5$Cl, which increases uniformity of lithium metal deposition.

Synthesis

Also provided are methods of making the lithium oxide argyrodites described herein. The methods involve adding Li$_2$O and LiX to Li$_3$PS$_4$. In some embodiments, the methods involve first producing Li$_3$PS$_4$ and then adding Li$_2$O and LiX (e.g., LiCl). It should be noted that this is different from production of sulfur-based argyrodites in which the precursor compounds can be mixed to undergo a mechanochemical reaction. For example, of Li$_2$S, P$_2$S$_5$, and LiCl can be mixed in a high energy ball mill to produce Li$_6$PS$_5$Cl. However, if one were to mix the desired ratio of Li$_2$S, Li$_2$O, P$_2$S$_5$, and LiCl under the same conditions, much of the oxygen would be involved in forming P—O bonds because of the competition between Li$_2$S and Li$_2$O in reacting with P$_2$S$_5$. This would result in leftover Li$_2$S in the structure, which in turn could lead to the formation of H$_2$S on contact with moisture.

In some embodiments, the methods involve solid state production of Li$_3$PS$_4$, for example by reacting Li$_2$S and P$_2$S$_5$ in a ball mill. The oxide and halide components may be added with further balling milling. Alternatively, the oxide and halide components may be added in a polar protic solvent such as ethanol, followed by evaporation of the solvent. In some embodiments, the methods involve solution synthesis of Li$_3$PS$_4$ in a polar aprotic solvent such as ethyl propionate. The oxide and halide components may then be added as described above.

After the lithium oxide argyrodite is synthesized, it may be annealed to increase conductivity. The anneal can take place at a temperature close to the melt temperature.

Example Syntheses

Li$_6$PS$_4$OCl

Under and argon atmosphere a 100 mL zirconia cup was charged with 3.568 g Li$_3$PS$_4$ glass (previously produced by ball milling Li$_2$S and P$_2$S$_5$ together), 0.592 g Li$_2$O, 0.840 g LiCl and 100 g 10 mm spherical zirconia milling media. The cup was hermetically sealed and the contents ground and mixed at 200 rpm for 30 minutes on a Pulverisette 5 ball mill. On the same mill the argyrodite was formed by milling at 400 rpm for 20 hours, reversing direction every hour with no rests between steps. After milling the cup is returned to an argon atmosphere and the newly formed argyrodite scraped from the cup walls. This material and the original zirconia media are returned to the cup, which is again sealed. The argyrodite is ground at 200 rpm for 10 minutes. The cups are again returned to an argon atmosphere, the material scraped out, and finally passed through a sieve stack with the fraction passing through a 25 μm sieve being collected. The as-made conductivity is measured, and the samples are annealed at 500° C. for 5 hours under argon atmosphere.

Li$_{5.6}$PS$_4$O$_{0.6}$Cl$_{1.4}$

Under and argon atmosphere a 100 mL zirconia cup was charged with 3.499 g Li$_3$PS$_4$ glass (previously produced by ball milling Li$_2$S and P$_2$S$_5$ together), 0.348 g Li$_2$O, 1.153 g LiCl and 100 g 10 mm spherical zirconia milling media. The cup was hermetically sealed and the contents ground and mixed at 200 rpm for 30 minutes on a Pulverisette 5 ball mill. On the same mill the argyrodite is formed by milling at 400 rpm for 20 hours, reversing direction every hour with no rests between steps. After milling the cup is returned to an argon atmosphere and the newly formed argyrodite scraped from the cup walls. This material and the original zirconia media are returned to the cup, which is again sealed. The argyrodite is ground at 200 rpm for 10 minutes. The cups are again returned to an argon atmosphere, the material scraped out, and finally passed through a sieve stack with the fraction passing through a 25 μm sieve being collected. The as-made conductivity is measured, and the samples are annealed at 500° C. for 5 hours under argon atmosphere.

As-made conductivity of $Li_6PS_4OCl$ argyrodite was measured at 0.42 mS/cm, which increased to 1.33 mS/cm after anneal. As-made conductivity of $Li_{5.6}PS_4O_{0.6}Cl_{1.4}$ argyrodite was measured at 1.54 mS/cm, which increased to 3.80 mS/cm after anneal. Raman spectra showed that there is $Li_3PS_4$ in the structure (as expected) and there are no indications of P—O bonds being formed. The conductivities are comparable to those of reference material $Li_6PS_5Cl$ (1.00 mS/cm as-made and 3.87 mS/cm after anneal).

Figure 4:
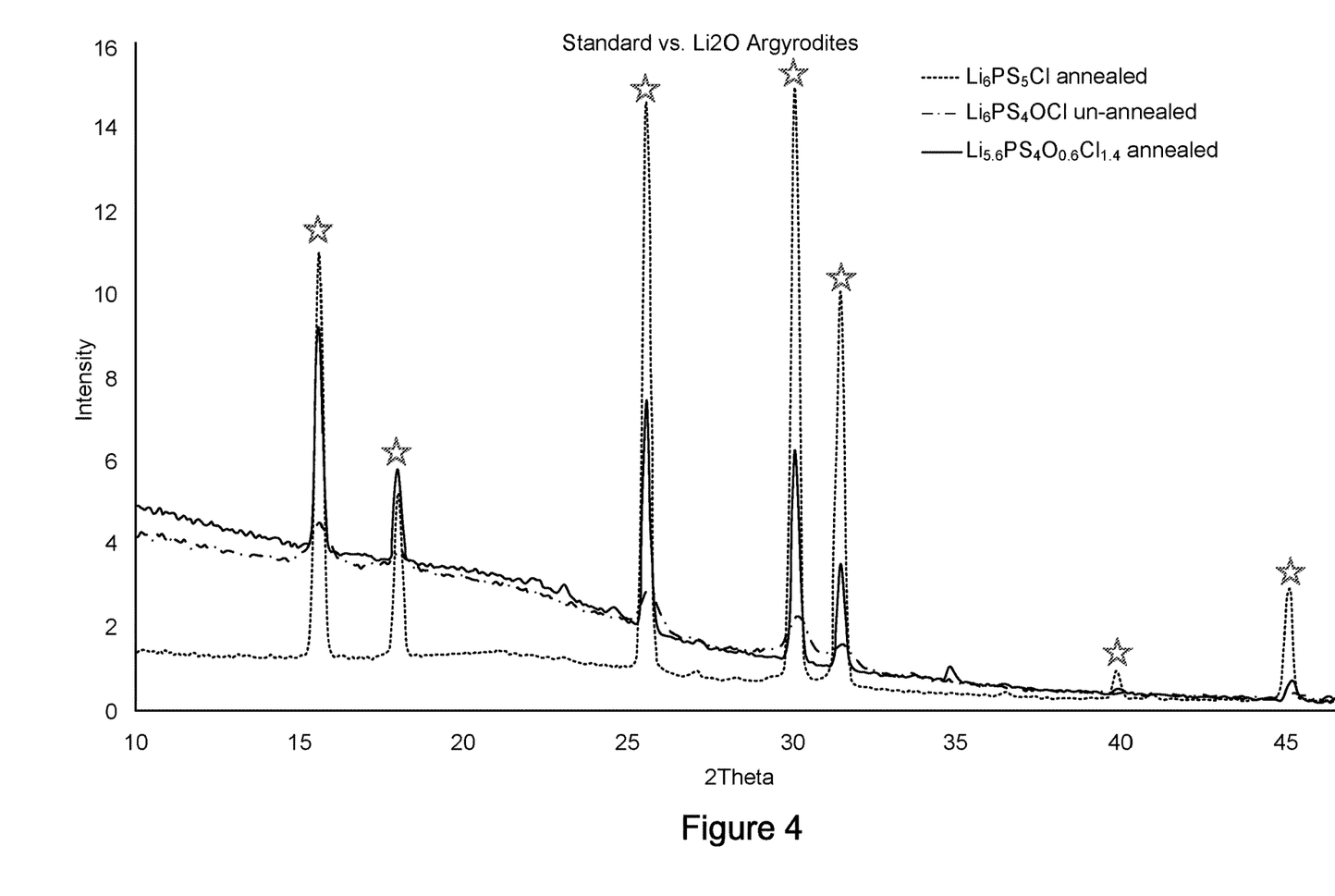
FIG. 4 shows X-ray diffraction patterns of $Li_6PS_5Cl$ and of $Li_6PS_4OCl$ and $Li_{5.6}PS_4O_{0.6}O_{1.4}$.

FIG. 4 shows X-ray diffraction patterns of $Li_6PS_5Cl$ and of $Li_6PS_4OCl$ and $Li_{5.6}PS_4O_{0.6}Cl_{1.4}$. The peaks marked with stars are associated with the argyrodite structure. The two oxygen-containing materials ($Li_6PS_4OCl$ and $Li_{5.6}PS_4O_{0.6}Cl_{1.4}$) match the argyrodite structure well. There are some small peaks that do not match the argyrodite structure in these materials as well as the reference sample $Li_6PS_5Cl$, indicating the presence of small crystalline impurities.

Figure 5:
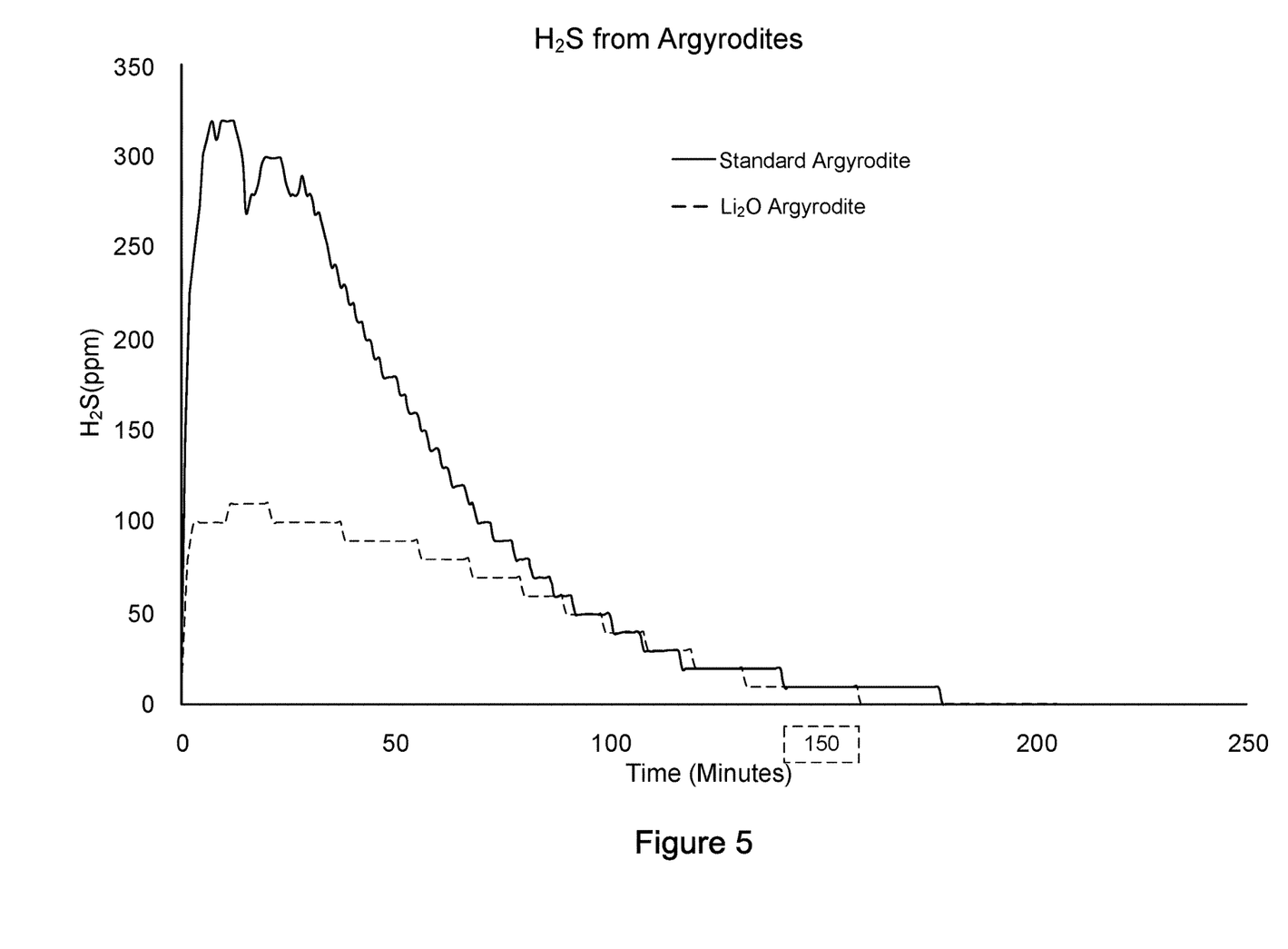
FIG. 5 shows $H_2S$ release on exposure of $Li_6PS_5Cl$ and $Li_6PS_4OCl$ to air at 50% relative humidity (RH) and 75° F.

FIG. 5 shows $H_2S$ release on exposure of $Li_6PS_5Cl$ and $Li_6PS_4OCl$ to air at 50% relative humidity (RH) and 75° F. The peak $H_2S$ concentration generated by the oxide-containing argyrodite is one-third that of the reference argyrodite $Li_6P_55Cl$ and the integrated total $H_2S$ release is 49% of that of the reference.

Alkali Metal Oxide Argyrodites

While lithium oxide argyrodites are described above, other alkali metal aygrodites are also provided herein. These include sodium oxide argyrodites and potassium oxide argyrodites. Thus, also provided herein are compositions in accordance with Formula IV:

(Formula IV)

where A is an alkali metal, X is a halide, and y is a number between 0 and 0.8, inclusive. The materials are co-crystals with the materials of Formula I also expressed as Formula V:

(Formula V)

where A is an alkali metal, X is a halide, and y is a number between 0 and 0.8, inclusive. In some embodiments, X is bromine (Br) or chlorine (Cl) such that the anion is a bromide or chloride. Mixed halide systems are also provided, with implementations of a two halide system given in Formula VI:

(Formula VI)

where A is an alkali metal, $X^1$ and $X^2$ are halides, y is a number between 0 and 0.8, inclusive and u+z=1+y.

In some embodiments, A is selected from lithium (Li), sodium (Na), and potassium (K). Formula I is an instance of Formula II with A being Li. As above, the general formulas, include embodiments in which oxygen and sulfur atoms exchange places with the overall argyrodite structure maintained. Sodium oxide argyrodites and potassium oxide argyrodites may be prepared in a similar fashion as described above with respect to lithium oxide argyrodites. Further, example syntheses for $Na_6PS_4OCl$ and $Na_{5.6}PS_4O_{0.6}Cl_{1.4}$ are given below. One having ordinary skill in the art will understand how to modify to synthesize other alkali metal argyrodites.

$Na_6PS_4OCl$

Under and argon atmosphere a 100 mL zirconia cup is charged with 3.273 g $Na_3PS_4$ glass (previously produced by ball milling $Na_2S$ and $P_2S_5$ together), 0.889 g $Na_2O$, 0.838 g NaCl and 100 g 10 mm spherical zirconia milling media. The cup is hermetically sealed and the contents ground and mixed at 200 rpm for 30 minutes on a Pulverisette 5 ball mill. On the same mill the argyrodite is formed by milling at 400 rpm for 20 hours, reversing direction every hour with no rests between steps. After milling the cup is returned to an argon atmosphere and the newly formed argyrodite scraped from the cup walls. This material and the original zirconia media are returned to the cup, which is again sealed. The argyrodite is ground at 200 rpm for 10 minutes. The cups are again returned to an argon atmosphere, the material scraped out, and finally passed through a sieve stack with the fraction passing through a 25 μm sieve being collected. The as-made conductivity is measured, and the samples are annealed, for example at 500° C., for 5 hours under argon atmosphere.

$Na_{5.6}PS_4O_{0.6}Cl_{1.4}$

Under and argon atmosphere a 100 mL zirconia cup is charged with 3.286 g $Na_3PS_4$ glass (previously produced by ball milling $Na_2S$ and $P_2S_5$ together), 0.536 g $Na_2O$, 1.178 g NaCl and 100 g 10 mm spherical zirconia milling media. The cup is hermetically sealed and the contents ground and mixed at 200 rpm for 30 minutes on a Pulverisette 5 ball mill. On the same mill the argyrodite is formed by milling at 400 rpm for 20 hours, reversing direction every hour with no rests between steps. After milling the cup is returned to an argon atmosphere and the newly formed argyrodite scraped from the cup walls. This material and the original zirconia media are returned to the cup, which is again sealed. The argyrodite is ground at 200 rpm for 10 minutes. The cups are again returned to an argon atmosphere, the material scraped out, and finally passed through a sieve stack with the fraction passing through a 25 μm sieve being collected. The as-made conductivity is measured, and the samples are annealed, for example at 450° C., for 5 hours under argon atmosphere.

Composites Including Alkali Metal Oxide Argyrodites

In some embodiments, a lithium oxide argyrodite or other alkali metal argyrodite may be mixed with a compliant material to form a composite solid ionic conductor. The compliant material may be an organic phase, for example, as described in U.S. Pat. Nos. 9,926,411 and 9,972,838, and U.S. patent application Ser. No. 16/241,784 incorporated by reference herein. The organic polymer phase may include one or more polymers and is chemically compatible with the inorganic ion conductive particles. In some embodiments, the organic phase has substantially no ionic conductivity, and is referred to as "non-ionically conductive." Non-ionically conductive polymers are described herein have ionic conductivities of less than 0.0001 S/cm.

In some embodiments, the organic phase includes a polymer binder, a relatively high molecular weight polymer. A polymer binder has a molecular weight of at least 30 kg/mol, and may be at least 50 kg/mol, or 100 kg/mol. In some embodiments, the polymer binder has a non-polar backbone. Examples of non-polar polymer binders include polymers or copolymers including styrene, butadiene, isoprene, ethylene, and butylene. Styrenic block copolymers including polystyrene blocks and rubber blocks may be used, with examples of rubber blocks including polybutadiene (PBD) and polyisoprene (PI). The rubber blocks may or may be hydrogenated. Specific examples of polymer binders are styrene ethylene butylene styrene (SEBS), styrene-butadiene-styrene (SBS), styrene-isoprene-styrene (SIS), styrene-butadiene rubber (SBR), polystyrene (PSt), PBD, polyethylene (PE), and PI. Non-polar polymers do not coat the inorganic particles, which can lead to reduced conductivity.

Smaller molecular weight polymers may be used to improve the processability of larger molecular weight polymers such as SEBS, reducing processing temperatures and pressures, for example. These can have molecular weights of 50 g/mol to 30 kg/mol, for example. Examples include polydimethylsiloxane (PDMS), polybutadiene (PBD), and polystyrene. In some embodiments, the first component is a cyclic olefin polymer (COP), the first component is a polyalkyl, polyaromatic, or polysiloxane polymer having end groups selected from cyano, thiol, amide, amino, sulfonic acid, epoxy, carboxyl, or hydroxyl groups.

The main chain or backbone of the polymeric components of the organic phase may not interact with the inorganic phase. Examples of backbones include saturated or unsaturated polyalkyls, polyaromatics, and polysiloxanes. Examples of backbones that may interact too strongly with the inorganic phase include those with strong electron donating groups such as polyalcohols, polyacids, polyesters, polyethers, polyamines, and polyamides. It is understood that molecules that have other moieties that decrease the binding strength of oxygen or other nucleophile groups may be used. For example, the perfluorinated character of a perfluorinated polyether (PFPE) backbone delocalizes the electron density of the ether oxygens and allows them to be used in certain embodiments.

In some embodiments, hydrophobic block copolymers having both plastic and elastic copolymer segments are used. Examples include styrenic block coploymers such as SEBS, SBS, SIS, styrene-isoprene/butadiene-styrene (SIBS), styrene-ethylene/propylene (SEP), styrene-ethylene/propylene-styrene (SEPS), and isoprene rubber (IR).

In some embodiments, the organic phase is substantially non-ionically conductive, with examples of non-ionically conductive polymers including PDMS, PBD, and the other polymers described above. Unlike ionically conductive polymers such as polyethylene oxide (PEO), polypropylene oxide (PPO), polyacrylonitrile (PAN), poly(methyl methacrylate) (PMMA), which are ionically conductive because they dissolve or dissociate salts such as LiI, non-ionically conductive polymers are not ionically conductive even in the presence of a salt. This is because without dissolving a salt, there are no mobile ions to conduct. In some embodiments, one of these or another ionically conductive polymer may be used. PFPE's, referred to above, and described in Compliant glass-polymer hybrid single ion-conducting electrolytes for lithium ion batteries, PNAS, 52-57, vol. 113, no. 1 (2016), incorporated by reference herein, are ionically conductive, being single ion-conductors for lithium and may be used in some embodiments.

Ionically conductive polymers such as PEO, PPO, PAN, and PMMA may be used in some embodiments with or without the presence of an additional salt.

In some implementations, the hybrid solid ionic conductors are formed from a precursor that is polymerized in situ after being mixed with the inorganic particles. The polymerization may take place under applied pressure that causes particle-to-particle contact. Once polymerized, applied pressure may be removed with the particles immobilized by the polymer matrix. In some implementations, the organic material includes a cross-linked polymer network. This network may constrain the inorganic particles and prevents them from shifting during operation. Cross-linked polymer networks can be cross-linked in-situ, i.e., after the inorganic particles are mixed with polymer or polymer precursors to form a composite. In-situ polymerization, including in-situ cross-linking, of polymers is described in U.S. Pat. No. 10,079,404, incorporated by reference herein.

The composite materials described herein may take various forms including films and slurries or pastes that may be used to fabricate composite films. According to various embodiments, the composites may include one of the following:

1) argyrodite precursors without argyrodite; and organic polymer;
2) argyrodite precursors, argyrodite, and organic polymer;
3) argyrodite with substantially no precursors; and organic polymer.

In some embodiments, the composites consist essentially of these constituents. In some other embodiments, additional components may be present as described further below. As indicated above, in some embodiments, the composites are provided as a solid film. Depending on the particular composition and the processing to date, the solid films may be provided in a device or ready for incorporation in a device without further processing, or may be provided in ready for in-situ processing of the argyrodite as described above. In the latter case, it may be provided as free-standing film or as incorporated into a device for processing.

The polymer matrix loading in the hybrid compositions may be relatively high in some embodiments, e.g., being at least 2.5%-30% by weight. According to various embodiments, it may between 0.5 wt %-60 wt % polymer, 1 wt %-40 wt % polymer, or 5 wt %-30 wt %. The composites form a continuous film.

The organic polymer is generally a non-polar, hydrophobic polymer as described above. In certain embodiments, it may be polymer precursors (monomers, oligomers, or polymers) that are also process in situ for polymerization and/or cross-linking. Such processing may occur during in situ processing of the argyrodite or prior to or after it.

In some embodiments, the argyrodite and/or precursors thereof, constitute 40 wt % to 95.5 wt % of the film. The balance may be organic polymer in some embodiments. In other embodiments, one or more additional components are present. Other components can include alkali metal ion salts, including lithium ion salts, sodium ion salts, and potassium ion salts. Examples include LiPF6, LiTFSI, LiBETI, etc. In some embodiments, the solid-state compositions include substantially no added salts. "Substantially no added salts" means no more than a trace amount of a salt. In some embodiments, if a salt is present, it does not contribute more than 0.05 mS/cm or 0.1 mS/cm to the ionic conductivity. In some embodiments, the solid-state composition may include one or more conductivity enhancers. In some embodiments, the electrolyte may include one or more filler materials, including ceramic fillers such as $Al_2O_3$. If used, a filler may or may not be an ion conductor depending on the particular embodiment. In some embodiments, the composite may include one or more dispersants. Further, in some embodiments, an organic phase of a solid-state composition may include one or more additional organic components to facilitate manufacture of an electrolyte having mechanical properties desired for a particular application.

In some embodiments, discussed further below, the solid-state compositions are incorporated into, or are ready to be incorporated into, an electrode and include electrochemically active material, and optionally, an electronically conductive additive. Examples of constituents and compositions of electrodes including argyrodites are provided below.

In some embodiments, the electrolyte may include an electrode stabilizing agent that can be used to form a passivation layer on the surface of an electrode. Examples of electrode stabilizing agents are described in U.S. Pat. No. 9,093,722. In some embodiments, the electrolyte may include conductivity enhancers, fillers, or organic components as described above.

In some embodiments, the composites are provided as a slurry or paste. In such cases, the composition includes a solvent to be later evaporated. In addition, the composition may include one or more components for storage stability. Such compounds can include an acrylic resin. Once ready for processing the slurry or paste may be cast or spread on a substrate as appropriate and dried. In situ processing as described above may then be performed.

The solid-state compositions may be prepared by any appropriate method with example procedures described below with reference to the Experimental results. Uniform films can be prepared by solution processing methods. In one example method, all components are mixed together by using laboratory and/or industrial equipment such as sonicators, homogenizers, high-speed mixers, rotary mills, vertical mills, and planetary ball mills. Mixing media can be added to aid homogenization, by improving mixing, breaking up agglomerates and aggregates, thereby eliminating film imperfection such as pin-holes and high surface roughness. The resulting mixture is in a form of uniformly mixed slurry with a viscosity varying based on the hybrid composition and solvent content. The substrate for casting can have different thicknesses and compositions. Examples include aluminum, copper and mylar. The casting of the slurry on a selected substrate can be achieved by different industrial methods. In some embodiments, porosity can be reduced by mechanical densification of films (resulting in, for example, up to about 50% thickness change) by methods such as calendaring between rollers, vertical flat pressing, or isostatic pressing. The pressure involved in densification process forces particles to maintain a close inter-particle contact. External pressure, e.g., on the order of 1 MPa to 600 MPa, or 1 MPa to 100 MPa, is applied. In some embodiments, pressures as exerted by a calendar roll are used. The pressure is sufficient to create particle-to-particle contact, though kept low enough to avoid uncured polymer from squeezing out of the press. Polymerization, which may include cross-linking, may occur under pressure to form the matrix. In some implementations, a thermal-initiated or photo-initiated polymerization technique is used in which application of thermal energy or ultraviolet light is used to initiate polymerization. The ionically conductive inorganic particles are trapped in the matrix and stay in close contact on release of external pressure. The composite prepared by the above methods may be, for example, pellets or thin films and is incorporated to an actual solid-state lithium battery by well-established methods.

In some embodiments, the films are dry-processed rather than processed in solution. For example, the films may be extruded. Extrusion or other dry processing may be alternatives to solution processing especially at higher loadings of the organic phase (e.g., in embodiments in which the organic phase is at least 30 wt %).

Devices

The alkali metal oxide argyrodites may be incorporated into any device that uses an ionic conductor, including but not limited to batteries and fuel cells. In a lithium battery, for example, the lithium oxide argyrodite may be the electrolyte or incorporated into the electrolyte. Similarly, the lithium oxide argyrodites may be incorporated into electrodes. In some embodiments, the lithium oxide argyrodites may be pressed or otherwise formed into solid-state ionic conductors for use in a device. In some embodiments, the lithium oxide argyrodites may be mixed with a compliant material to form a composite solid ionic conductor as described above.

In some embodiments, the composite solid compositions do not include an added salt. Lithium salts (e.g., LiPF6, LiTFSI), potassium salts, sodium salts, etc., may not be necessary due to the contacts between the ion conductor particles. In some embodiments, the solid compositions consist essentially of ion-conductive inorganic particles and an organic polymer matrix. However, in alternative embodiments, one or more additional components may be added to the hybrid solid composition.

The electrode compositions further include an electrode active material, and optionally, a conductive additive. Example cathode and anode compositions are given below.

For cathode compositions, the table below gives examples of compositions.

| Constituent | Active material | Lithium Oxide Agyrodite | Electronic conductivity additive | Organic phase |
|---|---|---|---|---|
| Examples | Transition Metal Oxide Transition Metal Oxide with layer structure NMC | $Li_{5.6}PS_4O_{0.6}Cl_{1.4}$ $Li_6PS_4OCl$ $Na_{5.6}PS_4O_{0.6}Cl_{1.4}$ | Carbon-based Activated carbons CNTs Graphene Graphite Carbon fibers Carbon black (e.g., Super C) | Hydrophobic block copolymers having soft and hard blocks SEBS |
| Wt % range | 65%-88% | 10%-33% | 1%-5% | 1%-5% |

According to various embodiments, the cathode active material is a transition metal oxide, with lithium nickel cobalt manganese oxide ($LiMnCoMnO_2$, or NMC) an example. Various forms of NMC may be used, including $LiNi_{0.6}Mn_{0.2}Co_{0.2}O_2$ (NMC-622), $LiNi_{0.4}Mn_{0.3}Co_{0.3}O_2$ (NMC-4330), etc. The lower end of the wt % range is set by energy density; compositions having less than 65 wt % active material have low energy density and may not be useful.

Any appropriate argyrodite may be used. $Li_{5.6}PS_4O_{0.6}Cl_{1.4}$ is an example of an argyrodite that retains high ionic conductivity and suppresses hydrogen sulfide. Compositions having less than 10 wt % argyrodite have low $Li^+$ conductivity.

An electronic conductivity additive is useful for active materials that, like NMC, have low electronic conductivity. Carbon black is an example of one such additive, but other carbon-based additives including other carbon blacks, activated carbons, carbon fibers, graphites, graphenes, and carbon nanotubes (CNTs) may be used. Below 1 wt % may not be enough to improve electronic conductivity while greater than 5% leads to decrease in energy density and disturbing active material-argyrodite contacts.

Any appropriate organic phase may be used. In particular embodiments, hydrophobic block copolymers having both plastic and elastic copolymer segments are used. Examples include styrenic block copolymers such as styrene-ethylene/butylene-styrene (SEBS), styrene-butadiene-styrene (SBS), styrene-isoprene-styrene (SIS), styrene-isoprene/butadiene-styrene (SIBS), styrene-ethylene/propylene (SEP), Styrene-Ethylene/Propylene-Styrene (SEPS), and isoprene rubber (IR). Below 1 wt % may not be enough to achieve desired mechanical properties while greater than 5% leads to decrease in energy density and disturbing active material-argyrodite-carbon contacts.

For anode compositions, the table below gives examples of compositions.

Any appropriate organic phase may be used. In particular embodiments, hydrophobic block copolymers having both plastic and elastic copolymer segments are used. Examples include styrenic block coplymers such as styrene-ethylene/butylene-styrene (SEBS), styrene-butadiene-styrene (SBS), styrene-isoprene-styrene (SIS), styrene-isoprene/butadiene-styrene (SIBS), styrene-ethylene/propylene (SEP), Styrene-Ethylene/Propylene-Styrene (SEPS), and isoprene rubber (IR). Below 1 wt % may not be enough to achieve desired mechanical properties while greater than 5% leads to decrease in energy density and disturbing active material-argyrodite-carbon contacts.

Provided herein are alkali metal batteries and alkali metal ion batteries that include an anode, a cathode, and a compliant solid electrolyte composition as described above operatively associated with the anode and cathode. The batteries may include a separator for physically separating the anode and cathode; this may be the solid electrolyte composition.

Examples of suitable anodes include but are not limited to anodes formed of lithium metal, lithium alloys, sodium metal, sodium alloys, carbonaceous materials such as graphite, and combinations thereof. Examples of suitable cathodes

| Constituent | Primary active material | Secondary active material | Argyrodite | Electronic conductivity additive | Organic phase |
|---|---|---|---|---|---|
| Examples | Si-containing Elemental Si Si alloys, e.g., Si alloyed with one or more of Al, Zn, Fe, Mn, Cr, Co, Ni, Cu, Ti, Mg, Sn, Ge | Graphite | $Li_{5.6}PS_4O_{0.6}Cl_{1.4}$ $Li_6PS_4OCl$ $Na_{5.6}PS_4O_{0.6}Cl_{1.4}$ | Carbon-based Activated carbons CNTs Graphene Carbon fibers Carbon black (e.g., Super C) | Hydrophobic block copolymers having soft and hard blocks SEBS |
| Wt % range | Si is 15%-50% | 5%-40% | 10%-50% | 0%-5% | 1%-5% |

Graphite is used as a secondary active material to improve initial coulombic efficiency (ICE) of the Si anodes. Si suffers from low ICE (e.g., less than 80% in some cases) which is lower than ICE of NMC and other cathodes causing irreversible capacity loss on the first cycle. Graphite has high ICE (e.g., greater than 90%) enabling full capacity utilization. Hybrid anodes where both Si and graphite are utilized as active materials deliver higher ICE with increasing graphite content meaning that ICE of the anode can match ICE of the cathode by adjusting Si/graphite ratio thus preventing irreversible capacity loss on the first cycle. ICE can vary with processing, allowing for a relatively wide range of graphite content depending on the particular anode and its processing. In addition, graphite improves electronic conductivity and may help densification of the anode.

Any appropriate argyrodite may be used. Any appropriate argyrodite may be used. $Li_{5.6}PS_4O_{0.6}Cl_{1.4}$ is an example of an argyrodite that retains high ionic conductivity and suppresses hydrogen sulfide. Compositions having less than 10 wt % argyrodite have low $Li^+$ conductivity.

A high-surface-area electronic conductivity additive (e.g., carbon black) may be used some embodiments. Si has low electronic conductivity and such additives can be helpful in addition to graphite (which is a great electronic conductor but has low surface area). However, electronic conductivity of Si alloys can be reasonably high making usage of the additives unnecessary in some embodiments. Other high-surface-area carbons (carbon blacks, activated carbons, graphenes, carbon nanotubes) can also be used instead of Super C.

include, but are not limited to cathodes formed of transition metal oxides, doped transition metal oxides, metal phosphates, metal sulfides, lithium iron phosphate, sulfur and combinations thereof. In some embodiments, the cathode may be a sulfur cathode.

In an alkali metal-air battery such as a lithium-air battery, sodium-air battery, or potassium-air battery, the cathode may be permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode.

In some embodiments, lithium-sulfur cells are provided, including lithium metal anodes and sulfur-containing cathodes. In some embodiments, the solid-state composite electrolytes described herein uniquely enable both a lithium metal anode, by preventing dendrite formation, and sulfur cathodes, by not dissolving polysulfide intermediates that are formed at the cathode during discharge.

A separator formed from any suitable material permeable to ionic flow can also be included to keep the anode and cathode from directly electrically contacting one another. However, as the electrolyte compositions described herein are solid compositions, they can serve as separators, particularly when they are in the form of a film.

In some embodiments, the solid electrolyte compositions serve as electrolytes between anodes and cathodes in alkali ion batteries that rely on intercalation of the alkali ion during cycling.

As described above, in some embodiments, the solid composite compositions may be incorporated into an electrode of a battery. The electrolyte may be a compliant solid electrolyte as described above or any other appropriate electrolyte, including liquid electrolyte.

In some embodiments, a battery includes an electrode/electrolyte bilayer, with each layer incorporating the ionically conductive solid-state composite materials described herein.

Figure 6A:
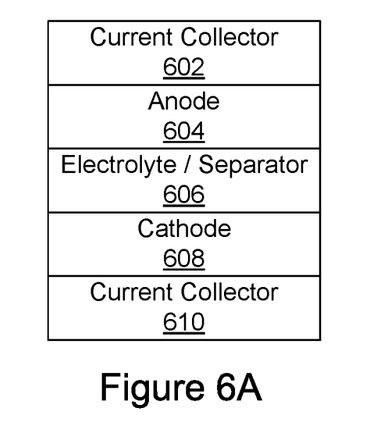
FIGS. 6A-6C show examples of schematic of cells including lithium oxide argyrodites.

FIG. 6A shows an example of a schematic of a cell according to certain embodiments of the invention. The cell includes a negative current collector 602, an anode 604, an electrolyte/separator 606, a cathode 608, and a positive current collector 610. The negative current collector 602 and the positive current collector 610 may be any appropriate electronically conductive material, such as copper, steel, gold, platinum, aluminum, and nickel. In some embodiments, the negative current collector 602 is copper and the positive current collector 610 is aluminum. The current collectors may be in any appropriate form, such as a sheet, foil, a mesh, or a foam. According to various embodiments, one or more of the anode 604, the cathode 608, and the electrolyte/separator 606 is a solid-state composite including a thiophilic metal doped argyrodite as described above. In some embodiments, two or more of the anode 604, the cathode 608, and the electrolyte 606 is solid-state composite including a thiophilic metal doped argyrodite, as described above.

In some embodiments, a current collector is a porous body that can be embedded in the corresponding electrode. For example, it may be a mesh. Electrodes that include hydrophobic polymers as described above may not adhere well to current collectors in the form of foils; however meshes provide good mechanical contact. In some embodiments, two composite films as described herein may be pressed against a mesh current collector to form an embedded current collector in an electrode.

Figure 6B:
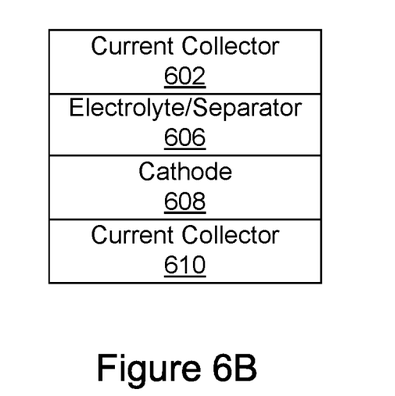
Figure 6C:
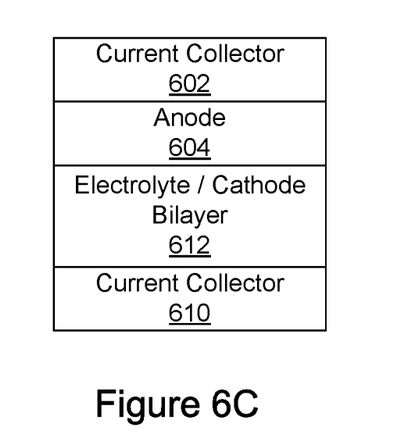

FIG. 6B shows an example of schematic of a lithium metal cell as-assembled according to certain embodiments of the invention. The cell as-assembled includes a negative current collector 602, an electrolyte/separator 606, a cathode 608, and a positive current collector 610. Lithium metal is generated on first charge and plates on the negative current collector 602 to form the anode. One or both of the electrolyte 606 and the cathode 608 may be a composite material as described above. In some embodiments, the cathode 608 and the electrolyte 606 together form an electrode/electrolyte bilayer. FIG. 6C shows an example of a schematic of a cell according to certain embodiments of the invention. The cell includes a negative current collector 602, an anode 604, a cathode/electrolyte bilayer 612, and a positive current collector 610. Each layer in a bilayer may include argyrodite. Such a bilayer may be prepared, for example, by preparing an electrolyte slurry and depositing it on an electrode layer.

All components of the battery can be included in or packaged in a suitable rigid or flexible container with external leads or contacts for establishing an electrical connection to the anode and cathode, in accordance with known techniques.

In the description above and in the claims, numerical ranges are inclusive of the end points of the range. For example, "y is a number between 0 and 0.8" includes 0 and 0.8. Similarly, ranges represented by a dash are inclusive of the end points of the ranges.

The invention claimed is:

1. A lithium oxide argyrodite of the general formula: $Li_{(6-y)}PS_4O_{(1-y)}X_{(1+y)}$ wherein X is a halide and wherein y is 0.1, 0.2, 0.3, 0.4, 0.5, or 0.6.

2. The lithium oxide argyrodite of claim 1, wherein X is Cl.

3. The lithium oxide argyrodite of claim 1, wherein y=0.1.

4. The lithium oxide argyrodite of claim 1, wherein y=0.2.

5. The lithium oxide argyrodite of claim 1, wherein y=0.3.

6. The lithium oxide argyrodite of claim 1, wherein y=0.4.

7. The lithium oxide argyrodite of claim 1, wherein y=0.5.

8. The lithium oxide argyrodite of claim 1, wherein y=0.6.

9. The lithium oxide argyrodite of claim 1, wherein X is Cl.

10. A solid-state battery or fuel cell comprising a solid electrolyte layer comprising a solid electrolyte material comprising the lithium oxide argyrodite of claim 1.

11. A lithium oxide argyrodite of the general formula: $Li_{(6-y)}PS_4O_{(1-y)}X_{(1+y)}$ wherein X is a halide and wherein y is between 0.3 and 0.5, inclusive of the endpoints 0.3 and 0.5 of the range.

12. The lithium oxide argyrodite of claim 11, wherein X is Cl.

13. A solid-state battery or fuel cell comprising a solid electrolyte layer comprising a solid electrolyte material comprising the lithium oxide argyrodite of claim 11.

14. A lithium oxide argyrodite of the general formula: $Li_{(6-y)}PS_4O_{(1-y)}X_{(1+y)}$ wherein X is a halide and wherein y is between 0.5 and 0.7, inclusive of the endpoints 0.5 and 0.7 of the range.

15. The lithium oxide argyrodite of claim 14, wherein X is Cl.

16. The lithium oxide argyrodite of claim 14, wherein y=0.7.

17. A solid-state battery or fuel cell comprising a solid electrolyte layer comprising a solid electrolyte material comprising the lithium oxide argyrodite of claim 14.

* * * * *